(12) United States Patent
Truskovsky et al.

(10) Patent No.: US 8,255,685 B2
(45) Date of Patent: Aug. 28, 2012

(54) SYSTEM AND METHOD FOR VALIDATING CERTIFICATE ISSUANCE NOTIFICATION MESSAGES

(75) Inventors: Alexander Truskovsky, Waterloo (CA); Van Quy Tu, Kitchener (CA); Cheryl Mok, Waterloo (CA); Shivangi Gandhi, Brampton (CA); Eli Jackson, Waterloo (CA); Neil Patrick Adams, Kitchener (CA)

(73) Assignee: Research In Motion Limited, Waterloo (CA)

( * ) Notice: Subject to any disclaimer, the term of this patent is extended or adjusted under 35 U.S.C. 154(b) by 607 days.

(21) Appl. No.: 12/405,366

(22) Filed: Mar. 17, 2009

(65) Prior Publication Data

US 2010/0241851 A1   Sep. 23, 2010

(51) Int. Cl.
*G06F 21/00* (2006.01)

(52) U.S. Cl. ........ 713/156; 709/206; 709/219; 709/227; 726/3; 713/176

(58) Field of Classification Search .......... 713/155–157; 709/227, 238; 726/10
See application file for complete search history.

(56) References Cited

U.S. PATENT DOCUMENTS

| | | | | |
|---|---|---|---|---|
| 5,996,076 A * | 11/1999 | Rowney et al. | ............... | 713/156 |
| 6,360,254 B1 * | 3/2002 | Linden et al. | ................. | 709/219 |
| 2003/0028647 A1 * | 2/2003 | Grosu | ........................... | 709/227 |
| 2003/0041110 A1 * | 2/2003 | Wenocur et al. | ............. | 709/206 |
| 2003/0115475 A1 | 6/2003 | Russo et al. | | |
| 2004/0015725 A1 * | 1/2004 | Boneh et al. | .................. | 713/201 |
| 2004/0111609 A1 * | 6/2004 | Kaji et al. | ..................... | 713/156 |
| 2004/0196978 A1 | 10/2004 | Godfrey et al. | | |
| 2005/0050222 A1 * | 3/2005 | Packer | .......................... | 709/238 |
| 2005/0076199 A1 | 4/2005 | Thornton et al. | | |
| 2005/0076205 A1 * | 4/2005 | Thornton et al. | ............. | 713/156 |
| 2005/0078830 A1 | 4/2005 | Thornton et al. | | |
| 2005/0081025 A1 | 4/2005 | Thornton et al. | | |
| 2005/0081026 A1 | 4/2005 | Thornton et al. | | |
| 2005/0149442 A1 | 7/2005 | Adams et al. | | |
| 2005/0257045 A1 | 11/2005 | Bushman et al. | | |
| 2006/0053291 A1 * | 3/2006 | Brown et al. | ................. | 713/175 |
| 2007/0073621 A1 | 3/2007 | Dulin et al. | | |
| 2007/0094493 A1 | 4/2007 | Ali et al. | | |

(Continued)

FOREIGN PATENT DOCUMENTS

EP   1881665 A1   1/2008

OTHER PUBLICATIONS

Lopez Millan, G. et al., "Deploying Secure Cryptographic Srevices in Multi-Domain IPv6 Network", Advanced Information Networking and Applications, 2005. AINA 2005. 19th Internatioanl Conference on Taipei, Taiwan Mar. 25-30, 2005, Piscataway, NJ, USA, IEEE, vol. 2, Mar. 25, 2005, pp. 785-789.*

(Continued)

*Primary Examiner* — Philip Chea
*Assistant Examiner* — Dorianne Alvarado David
(74) *Attorney, Agent, or Firm* — Ridout & Maybee LLP

(57) ABSTRACT

To validate a received certificate issuance notification message, a device may verify that the certificate issuance notification message conforms to expected norms or authenticate a signature associate with the certificate issuance notification message. Upon validating, the device may then transmit a uniform resource locator, extracted from the certificate issuance notification message, to a network entity configured for processing certificate issuance.

10 Claims, 11 Drawing Sheets

U.S. PATENT DOCUMENTS

| | | | |
|---|---|---|---|
| 2007/0288746 A1 | 12/2007 | Jones | |
| 2008/0034212 A1* | 2/2008 | Altieri | 713/176 |
| 2008/0209208 A1* | 8/2008 | Parkinson | 713/156 |
| 2008/0288598 A1* | 11/2008 | French et al. | 709/206 |
| 2009/0089859 A1* | 4/2009 | Cook et al. | 726/3 |
| 2009/0300121 A1* | 12/2009 | Bartlett | 709/206 |
| 2010/0275027 A1* | 10/2010 | Belrose et al. | 713/176 |

OTHER PUBLICATIONS

ETSI, Digital Cellular Telecommunications System (Phase 2+); Universal Mobile Telecommunications System (UMTS); Generic Authentication Architecture (GAA); Support for Subscriber Certificates (3GPP TS 33.221 version 7.1.0 Release 7), ETSI Standards, LIS, Sophia Antipolis, Cedex, France, vol. 3-SA3, No. V7.1.0, Jan. 1, 2008.

European Search Report, Application No. 08167341.0-1244, dated Apr. 20, 2009.

RSA Laboratories, PKCS #10 v1.7: Certification Request Syntax Standard, May 26, 2000.

BlackBerry, BlackBerry Mobile Data System, Sep. 9, 2008.

Lopez Millan G et al. Deploying Secure Cryptographic Services in Multi-Domain IPv6 Networks, Advanced Information Networking and Applications 2005, AINA 2005, 19th International Conference on Taipei, Taiwan Mar. 25-30, 2005, Piscataway, NJ, USA IEEE, vol. 2, Mar. 25, 2005, pp. 785-789, XP010790112, ISBN: 978-0-7695-2249-4.

Extended European Search Report, regarding application No. 09155414.7, dated Sep. 22, 2009.

* cited by examiner

SYSTEM AND METHOD FOR VALIDATING CERTIFICATE ISSUANCE NOTIFICATION MESSAGES

FIELD

The present application relates generally to handling certificate issuance notification messages and, more specifically, to validating such certificate issuance notification messages.

BACKGROUND

User devices, including, but not restricted to, wireless mobile communication devices, personal computers, laptop or portable computers, smartphones, personal digital assistants (PDAs), and the like, may generate cryptographic keys for use in a public key infrastructure (PKI) scheme. In a PKI scheme, a device generates a public key and a corresponding private key. However, such keys are of little use unless the public key is reliably associated with the identity of the user device, or of the user of the user device.

A public key certificate (or identity certificate) is an electronic document, issued by a trusted party. The public key certificate incorporates a digital signature to bind together a public key with an identity—information such as the name of a person or an organization, an associated address and so forth. The certificate can be used to verify that a public key belongs to an individual.

An identity certificate typically contains: a public key; an owner's name; an expiration date of the public key; the name of the issuer; an identity of the Certificate Authority that issued the digital certificate; a serial number for the digital certificate; and a digital signature of the issuer.

BRIEF DESCRIPTION OF THE DRAWINGS

Reference will now be made to the drawings, which show by way of example, embodiments, and in which.

DETAILED DESCRIPTION OF THE EMBODIMENTS

Figure 1:
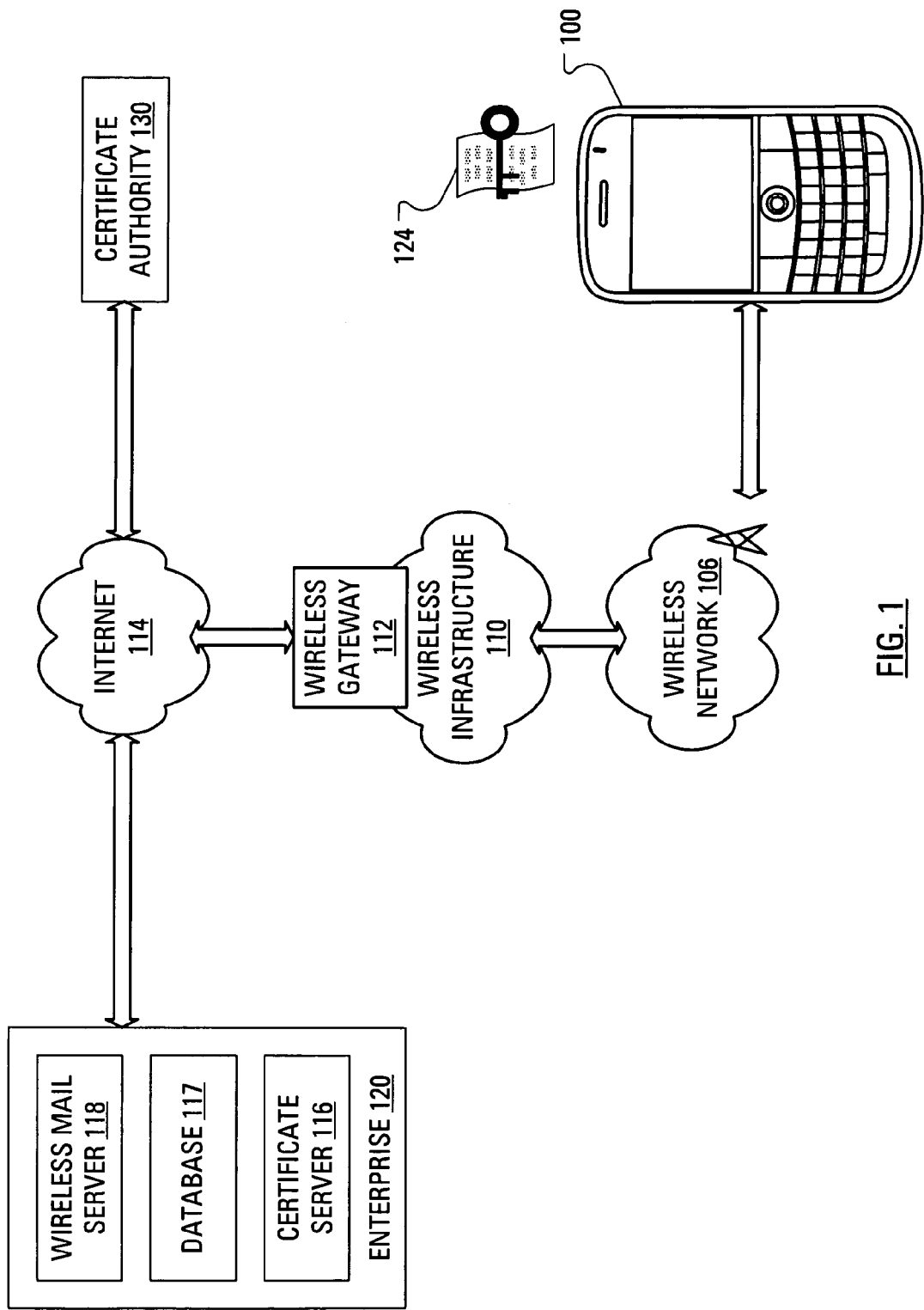
FIG. 1 illustrates an example system, including a mobile communication device, a certificate authority and an enterprise that includes a mail server and a certificate server, in which aspects of the present application find use.

In PKI systems, a certificate signing request (also "CSR" or certification request) is a message sent from an applicant to a Certificate Authority (CA) to apply for an identity certificate for a public key that has been previously generated, in conjunction with generation of an associated private key. The certification request contains information identifying the applicant and the public key generated by the applicant. The corresponding private key is not included in the certification request, but is used in the generation of a digital signature that accompanies the certification request.

If the certification request is successful, the CA will send back an identity certificate that has been digitally signed with the private key of the CA.

Sometimes the CA is an enterprise CA, other times the CA is a standalone CA, hosted offsite. An administrator of the CA does not always have control over the manner in which requested certificates are approved. In some situations, the CA issues the identity certificate right away in response to the certification request. In other situations, the CA does not issue the certificate right away in response to the certification request. Instead, the CA issues the identity certificate to the user device at a later time. In either case, the CA transmits the issued identity certificate to the applicant, for example, as an attachment to an e-mail message.

When the e-mail message with the attached identity certificate is received at the user device, it is left to the user to determine, first of all, that the received e-mail message has a certificate attached and, second of all, that the attached certificate is the certificate that was requested in the certification request sent to the certificate server. Where the user device is a wireless communication device, it may be that the attachment is not sent to the user device with the e-mail message. Instead, a wireless mail server through which the user device receives e-mail messages, may retain attachments associated with e-mail messages forwarded to wireless communication devices, thereby avoiding an undue burden on the wireless channels. Accordingly, it is left for the user to specifically request to download the certificate from the wireless mail server. Once the identity certificate has been downloaded, it is left for the user to specifically arrange importation of the certificate into a "key store" on the user device. Such certificate management may be considered to be awkward for all but the most technically savvy of users.

Rather than transmit the identity certificate to the user device as an attachment to an e-mail message, some CAs will send a certificate issuance notification e-mail message to notify the user that the certificate request has been approved, i.e., that the requested identity certificate has been issued by the CA. Such a certificate issuance notification e-mail message may contain a Uniform Resource Locator (URL) that can be used to retrieve the issued identity certificate.

Where the user device is a wireless communication device, there may be intermediaries between the CA and the user device. In particular, e-mail messages destined for the user device may be managed by a wireless mail server that control the timing and extent of transmission of messages to user device. Additionally, a certificate server may be in place to manage outgoing certificate requests and the corresponding replies from the CAs.

Upon receipt of a certificate issuance notification e-mail message including a URL representative of the identity certificate, a wireless mail server or certificate server may use the URL to retrieve the identity certificate. Once the identity certificate has been retrieved, the wireless mail server or certificate server may push the identity certificate to the user device. This scenario presents several problems that need to be addressed.

One problem may present itself in that, in the absence of an automated mechanism at the user device, the user of the user device needs to be made aware to expect receipt of the pushed identity certificate and to manually deal with the identity certificate, i.e., arrange importation of the certificate into the key store on the user device. This may be perceived as a problem by an administrator that does not want users to be aware of the certificate request process.

Another problem may present itself in that, even if users were made aware of the certificate request process, the user device browser may be configured so that identity certificates may not be downloaded to the user device. The user in this case can use a desktop computer to download the identity certificate and then transfer the identity certificate to the user device.

A further problem may present itself in configuring the wireless mail server or certificate server to be robust enough to deal with forged e-mail messages, thereby protecting the CA from processing malicious identity certificate requests from external sources (i.e., outside the corporate firewall) and prevent the user from accessing malicious identity certificate sources.

To validate a received certificate issuance notification message, a device may verify that the certificate issuance notification message conforms to expected norms or authenticate a signature associate with the certificate issuance notification message.

In accordance with an aspect of the present disclosure, there is provided a method of validating a certificate issuance notification message. The method includes receiving a message, determining that the message comprises a certificate issuance notification message, verifying that the certificate issuance notification message conforms to expected norms and, responsive to the verifying, transmitting a uniform resource locator, extracted from the certificate issuance notification message, to a network entity configured for processing certificate issuance. In other aspects of the present disclosure, there is provided a mail server for carrying out this method and a computer readable medium storing instructions to allow a processor to carry out this method.

In accordance with another aspect of the present disclosure, there is provided a method of validating a certificate issuance notification message. The method includes receiving a message, determining that the message comprises a certificate issuance notification message, determining that the message is associated with a signature, authenticating the signature, responsive to the authenticating, extracting a uniform resource locator from the certificate issuance notification message and transmitting the uniform resource locator to a network entity configured for processing certificate issuance. In other aspects of the present disclosure, there is provided a mail server for carrying out this method and a computer readable medium storing instructions to allow a processor to carry out this method.

Other aspects and features of the present invention will become apparent to those of ordinary skill in the art upon review of the following description of specific embodiments of the invention in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the overview of FIG. 1.

FIG. 1 shows a user device in the form of a mobile communication device 100. It will be appreciated by those skilled in the art that the mobile communication device 100 may comprise any computing or communication device that is capable of connecting to a network by wireless means, including, but not limited, to personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The user device 100 may, for example, be connected to an Internet Service Provider on which a user of the system of FIG. 1, likely the user associated with the user device 100 illustrated in FIG. 1, has an account.

The user device 100 may be capable of sending and receiving messages and other data via wireless transmission and reception, as is typically done using electromagnetic waves in the radio frequency (RF) spectrum. The exchange of messages and other data may occur, for instance, between the user device 100 and a base station in a wireless network 106. The user device 100 may receive data by other means, for example through a direct connection to a port provided on the user device 100. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the user device 100 and the Internet 114 allows the user device 100 to access a certificate server 116 that is connected to the Internet 114. Also connected to the Internet 114 may be a wireless mail server 118. The certificate server 116 and the wireless mail server 118 may be grouped together in an enterprise 120 and share access to a database 117. Also connected to the Internet 114 may be a certificate authority 130. The user device 100 may store a key pair 124 that includes a private cryptographic key and a corresponding public cryptographic key.

Figure 2:
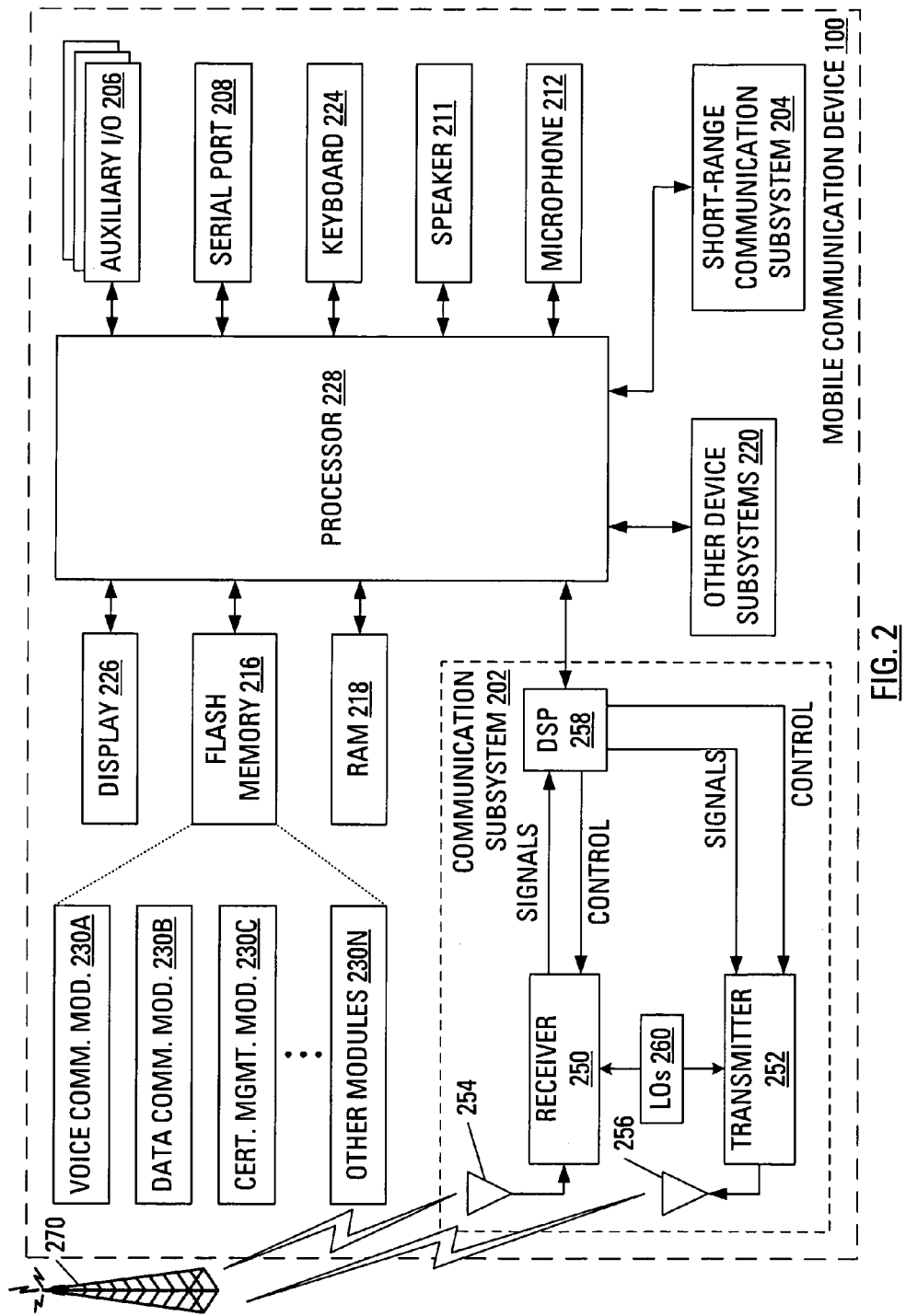
FIG. 2 illustrates a block diagram of a mobile communication device as an example of a device that may request certificate issuance.

FIG. 2 illustrates the user device 100. The user device 100 includes a housing, an input device (e.g., a keyboard 224 having a plurality of keys) and an output device (e.g., a display 226), which may comprise a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the user device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the user device 100 are shown schematically in FIG. 2. These may include a communications subsystem 202, a short-range communications subsystem 204, the keyboard 224 and the display 226. The user device 100 may further include other input/output devices, such as a set of auxiliary I/O devices 206, a serial port 208, a speaker 211 and a microphone 212. The user device 100 may further include memory devices including a flash memory 216 and a Random Access Memory (RAM) 218 and various other device subsystems 220. The user device 100 may comprise a two-way radio frequency (RF) communication device having voice and data communication capabilities. In addition, the user device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the user device 100. A predetermined set of software applications that control basic device operations, such as a voice communications module 230A and a data communications module 230B, may be installed on the user device 100 during manufacture. A certificate management module 230C may also be installed on the user device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the user device 100 is intended to operate. For example, the communication subsystem 202 of the user device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the user device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the user device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the user device 100. In addition, the display 226 may also be utilized in voice communication mode, for example, to display the identity of a calling party, the duration of a voice call, or other voice call related information.

The short-range communications subsystem 204 enables communication between the user device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 3:
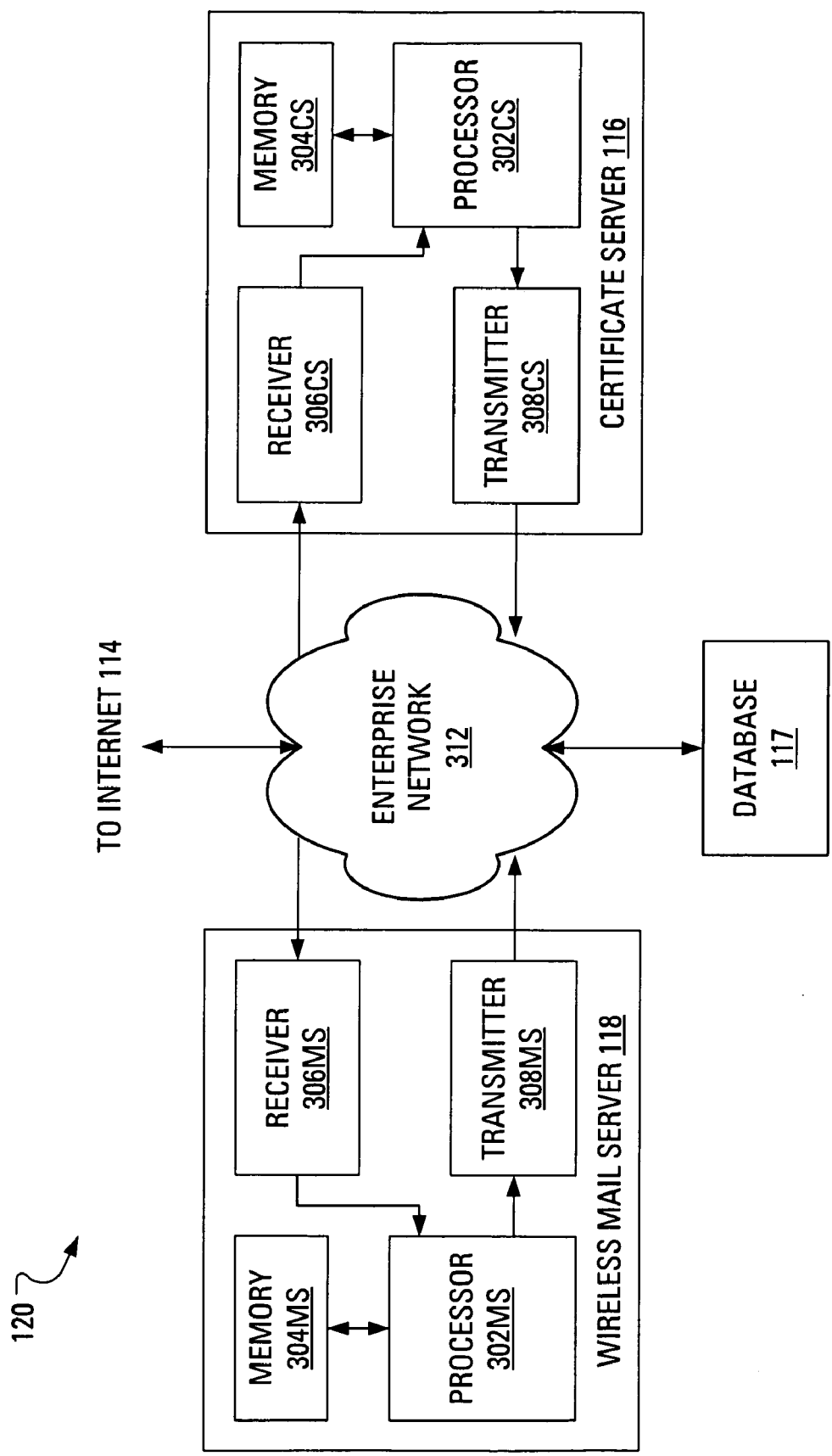
FIG. 3 illustrates a block diagram of the enterprise of FIG. 1.

Elements of the enterprise 120 are illustrated in greater detail in FIG. 3. In particular, the wireless mail server 118 is illustrated as having a mail server processor 302MS in communication with a mail server memory 304MS, a mail server receiver 306MS and a mail server transmitter 308MS. Similarly, the certificate server 116 is illustrated as having a certificate server processor 302CS in communication with a certificate server memory 304CS, a certificate server receiver 306CS and a certificate server transmitter 308CS. The certificate server 116 and the wireless mail server 118 communicate with each other, with the database 117 and with the internet 114 through an enterprise network 312.

In overview, the wireless mail server 118 and the certificate server 116 may be configured to verify messages in the certificate request process. Such verifying may take the form of determining that a given message conforms to expected norms or authenticating a signature associated with the given message.

To prepare the user device 100 for certificate management, the wireless mail server 118 transmits an information technology (IT) policy to the user device 100. In part, the IT policy includes a CA profile. The CA profile includes a description of a set of information needed by the user device 100 to generate the key pair 124 and compile the information necessary to formulate a certification request for the CA 130. Examples of such information include key lengths, algorithm information, necessary distinguished name information, etc.

An example CA profile has the following structure:
Certificate Authority Profile Name: Test Profile
Certificate Authority Type: MS-Enterprise
Certificate Authority Host: ca.test.domain
Certificate Port: 12345
Key Algorithm: RSA
Key Length: 2048

Figure 4:
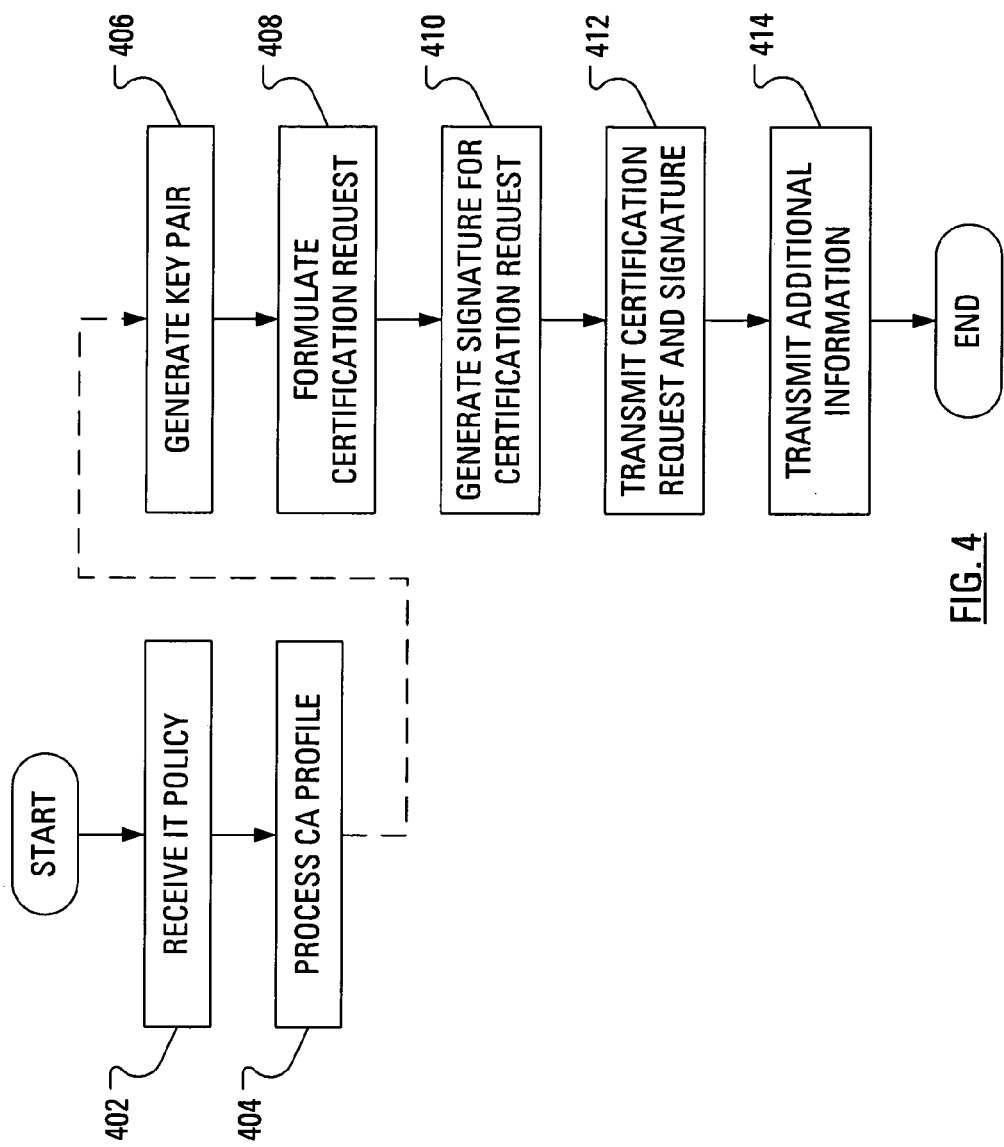
FIG. 4 illustrates example steps in a method of managing, at the mobile communication device of FIG. 2, a certification request according to an embodiment.

Example steps in a method of managing, at the user device 100, a certification request are illustrated in FIG. 4. As discussed above, the user device 100 receives (step 402) an IT policy that includes a CA profile that allows the user device 100 to formulate a certification request. Upon receiving the CA profile, the device processes (step 404) the CA profile.

Some time later, the user device 100 may require a cryptographic key pair. Accordingly, the user device 100 generates (step 406) the public-private key pair 124 and collects any other information that, according to the CA profile, needs to be sent as part of the certification request. The user device 100 then formulates (step 408) the certification request.

The certification request may be, for example, a PKCS-10 certification request. "PKCS" refers to a group of Public Key Cryptography Standards devised and published by RSA Security. PKCS-10, in particular, is a Certification Request Standard that defines a format for messages sent to a certification authority to request certification of a public key. The PKCS-10 standard is specified in Request For Comments (RFC) 2986 published by the Internet Engineering Task Force (IETF) at www.ietf.org.

After formulating the certification request, the user device 100 generates a signature (step 410) for the certification request. Such signature generation for the certification request may involve generating a hash of the certification request and encrypting the hash of the certification request using the private key half of the key pair 124. The encrypted hash of the certification request may then be transmitted along with the certification request as a signature. Once the certification request has been signed, the user device 100 transmits (step 412) the certification request and the signature to the certificate server 116.

In addition to transmitting (step 412) the certification request and signature, the user device 100 may also transmit (step 414) additional information about the public key for which the certification request has been generated. In particular, the user device 100 may transmit (step 414), to the certificate server 116, other properties of the CA profile used when formulating the certification request. The additional information may allow the certificate server 116 to retrieve information necessary to verify that the formulated certification request contains all the necessary information.

Figure 5:
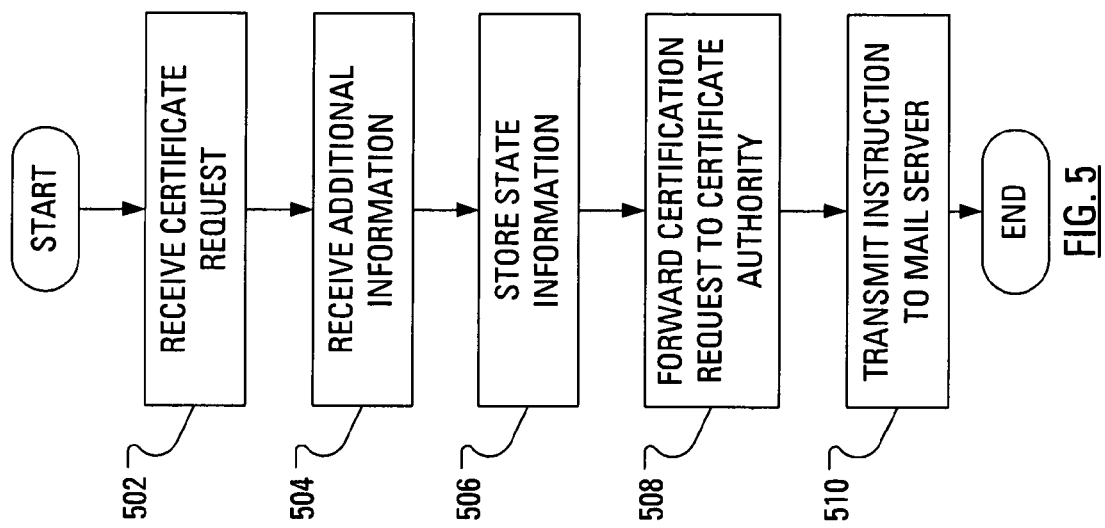
FIG. 5 illustrates example steps in a method of handling, at the certificate server of FIG. 1, the certification request from the mobile communication device.

Example steps in a method of handling, at the certificate server 116, the certification request from the user device 100 are illustrated in FIG. 5. Initially, the certificate server 116 may receive (step 502) the certification request from the user device 100. Additionally, the certificate server 116 may receive (step 504) the additional information from the user device 100. Responsive to receiving (steps 502, 504) the certification request and the additional information from the user device 100, the certificate server 116 may store (step 506) some state data about the certification request locally. For instance, the certificate server 116 may record the additional information received (in step 504) in conjunction with the certification request.

In one embodiment, the additional information may comprise an ID for the CA profile. Since the certificate server 116 needs to know where to forward a certification request to, the certificate server 116 can look up the required information based on the CA profile ID. Using the example CA profile, the certificate server 116 would forward the certification request to the Certificate Authority Host, ca.test.domain, that is listening on port 12345.

Additionally, the certificate server 116 forwards (step 508) the certification request to the CA 130. Subsequently, the certificate server 116 may transmit (step 510) an instruction to the wireless mail server 118 to activate identity certificate handling.

Figure 6:
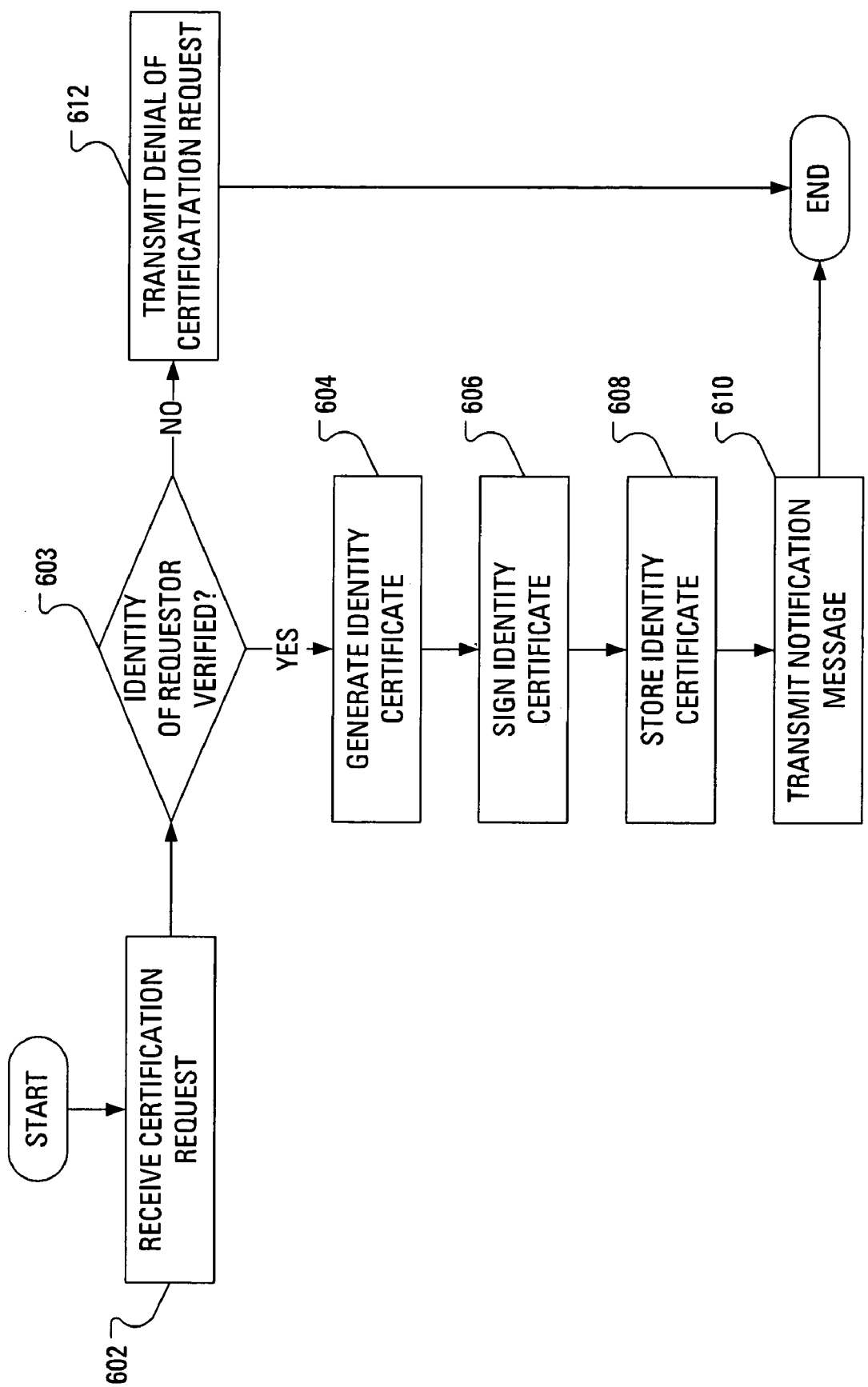
FIG. 6 illustrates example steps in a method of handling, at the certificate authority of FIG. 1, the certification request from the certificate server of FIG. 1.

Example steps in a method of handling, at the CA 130, the certification request from the certificate server 116 are illustrated in FIG. 6.

Upon receiving (step 602) the certification request from the certificate server 116, the CA 130 may carry out an identity verification process (step 603) to ensure that the certification request came from the user device 100, as indicated in the certification request. As mentioned, the user device 100 generates (step 410, FIG. 4) a signature for the certification request with its private key. Accordingly, the identity verification process carried out by the CA 130 may involve authenticating the signature transmitted with the certification request through use of the public key associated with the user device 100.

Upon successfully verifying the identity of the user device 100, the CA 130 generates (step 604) an identity certificate. The CA 130 may, for instance, generate the identity certificate according to a standard published by the Telecommunication Standardization Sector of the International Telecommunication Union. The sector is known as ITU-T and the standard is known as X.509. Along with the format for identity certificates, the X.509 standard covers standard formats for certificate revocation lists, attribute certificates, and a certification path validation algorithm. Once the identity certificate has been generated, the CA 130 signs (step 606) the identity certificate with its private key and stores (step 608) the identity certificate. The CA 130 the transmits (step 610) an unsigned certificate issuance notification e-mail message addressed to the user device 100, the certificate issuance notification e-mail message including a URL indicating the storage location from which the identity certificate may be fetched.

Upon failure to verify the identity of the user device 100, the CA 130 may transmit (step 612) a denial of the certification request addressed to the user device 100.

Figure 7:
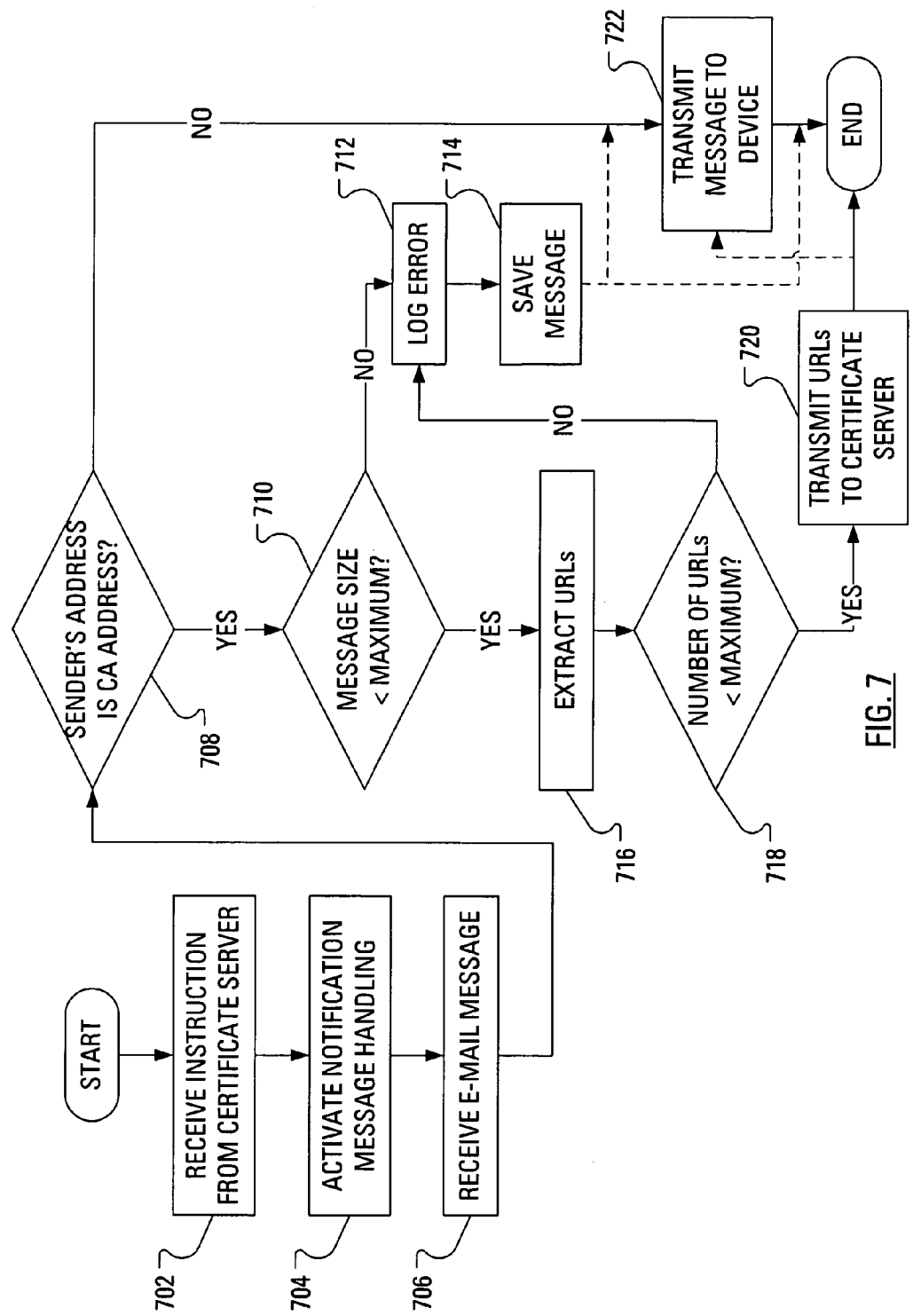
FIG. 7 illustrates example steps in a method of handling, at the mail server of FIG. 1, a certificate issuance notification e-mail message from the certificate authority of FIG. 1.

Example steps in a method of handling, at the wireless mail server 118, the certificate issuance notification e-mail message from the CA 130 are illustrated in FIG. 7. The wireless mail server 118 routinely receives e-mail messages that are to be forwarded to the user device 100 and to other devices.

Upon receiving (step 702) an instruction from the certificate server 116, wireless mail server 118 may depart from routine message handling and activate (step 704) certificate issuance notification message handling, wherein the wireless mail server 118 receives (step 706) an incoming e-mail message and inspects the incoming e-mail message to determine (step 708) whether the sender address of the incoming e-mail message matches the previously recorded address for the CA 130. Such determining may be accomplished by inspecting the header of the incoming e-mail message.

Responsive to determining (step 708) that the sender address of the incoming e-mail message does not match the previously recorded address for the CA 130, the wireless mail server 118 may simply forward (step 722) the e-mail message to the user device 100.

Responsive to determining (step 708) that the sender address of the incoming e-mail message does match the previously recorded address for the CA 130, the wireless mail server 118 may determine (step 710) whether the size of the e-mail message is less than a maximum expected size for an e-mail message from the CA 130. Such a maximum expected size may be configurable by an administrator of the wireless mail server 118.

Upon determining (step 710) that the size of the e-mail message exceeds the maximum expected size for an e-mail message from the CA 130, the wireless mail server 118 may log (step 712) the event as an error and save (step 714) the e-mail message for further investigation. The wireless mail server 118 may forward (step 722) the e-mail message to the user device 100, or not, depending on configuration of the wireless mail server 118.

Upon determining (step 710) that the size of the e-mail message is less than the maximum expected size for an e-mail message from the CA 130, the wireless mail server 118 may extract (step 716) one or more URLs from the e-mail message. The wireless mail server 118 may then determine (step 718) whether the number of URLs is less than a maximum expected count of URLs for an e-mail message from the CA 130. Such a maximum expected count of URLs may be configurable by an administrator of the wireless mail server 118.

Upon determining (step 718) that the number of URLs exceeds the maximum expected count of URLs for an e-mail message from the CA 130, the wireless mail server 118 may log (step 712) the event as an error and save (step 714) the e-mail message for further investigation. The wireless mail server 118 may forward (step 722) the e-mail message to the user device 100, or not, depending on configuration of the wireless mail server 118.

Upon determining (step 718) that the number of URLs is less than the maximum expected count of URLs for an e-mail message from the CA 130, the wireless mail server 118 may transmit (step 720) the URLs extracted from the e-mail message to the certificate server 116. The wireless mail server 118 may also transmit an indication of the e-mail address of the intended recipient of the certificate issuance notification e-mail message, determined from the header of the certificate issuance notification e-mail message, to the certificate server 116.

Figure 8:
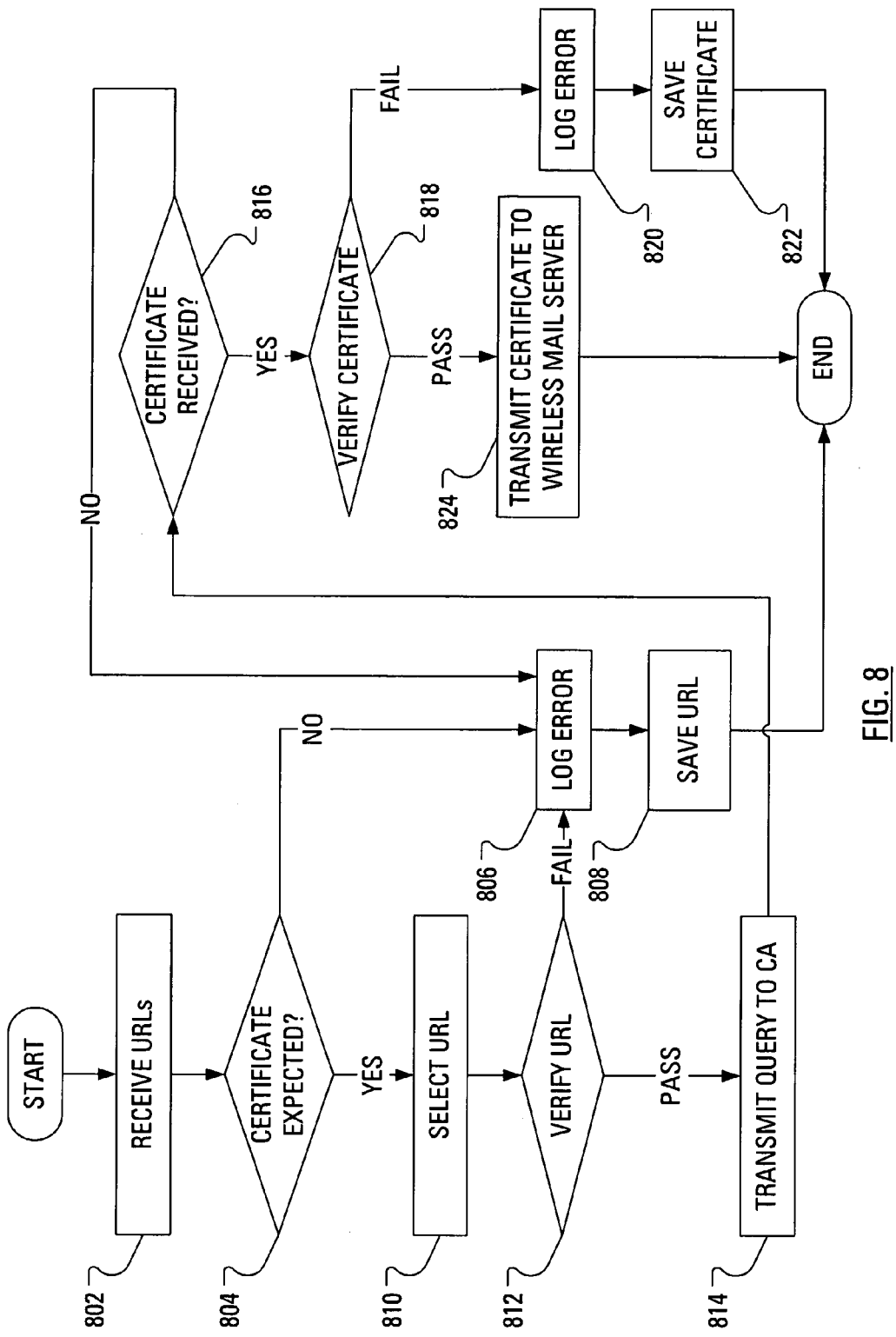
FIG. 8 illustrates example steps in a method of handling, at the certificate server of FIG. 1, URLs received from the wireless mail server of FIG. 1.

Example steps in a method of handling, at the certificate server 116, the URLs from the wireless mail server 118 are illustrated in FIG. 8. Upon receiving (step 802) the URLs, and the indication of the e-mail address of the intended recipient, from the wireless mail server 118, the certificate server 116 determines (step 804) whether an identity certificate is expected to be received by the intended recipient, as identified, for instance, by a destination e-mail address in the header of the e-mail message.

Upon determining (step 804) that an identity certificate is not expected to be received by the intended recipient, the certificate server 116 may log (step 806) the event as an error and save (step 808) the e-mail address and the URLs for further investigation.

Upon determining (step 804) that at least one identity certificate is expected to be received by the intended recipient, the certificate server 116 may verify the URLs. In particular, the certificate server 116 may select (step 810) one of the URLs for consideration and then verify (step 812) the selected URL.

It is anticipated that all of the URLs from a specific CA will begin with the same prefix and end with one or more identifying parameters. The one or more identifying parameters should uniquely identify a specific identity certificate or identify a certificate request. During configuration, the certificate server 116 may be provided with the prefix that corresponds to each of the CAs from which the certificate server 116 may be expected to retrieve identity certificates. The certificate server 116 may verify (step 812) the selected URL by confirming that the prefix of the URL matches a prefix associated with one of the CAs from which the certificate server 116 may be expected to retrieve identity certificates.

In the event that the URL fails verification (step 812), the certificate server 116 may log (step 806) the event as an error and save (step 808) the URL for further investigation.

In the event that the URL passes verification (step 812), the certificate server 116 may use the URL to transmit (step 814) a query to the CA 130.

Upon determining (step 816) that an identity certificate has been received responsive to the query transmitted (in step 814) to the CA 130, the certificate server 116 may verify (step 818) that the received identity certificate contains the correct public key and is signed by the CA 130.

Upon determining (step 816) that no identity certificate has been received responsive to the query transmitted (step 814) to the CA 130, the certificate server 116 may log (step 806) the event as an error and save (step 808) the e-mail address and the URL for further investigation. To confirm that the received identity certificate was generated by the CA 130, the certificate server 116 may process a signature included with the identity certificate. Such processing may involve the use of the public key of the CA 130. One manner in which the certificate server 116 may come to have the public key of the CA 130 is through configuration by an administrator of the certificate server 116.

If the certificate server 116 fails to verify (step 818) that the received identity certificate contains the correct public key and is signed by the CA 130, the certificate server 116 may log (step 820) the event as an error and save (step 822) the identity certificate for further investigation.

If the verification (step 818) of the received identity certificate succeeds, the certificate server 116 transmits (step 822) the received identity certificate to the wireless mail server 118.

Figure 9:
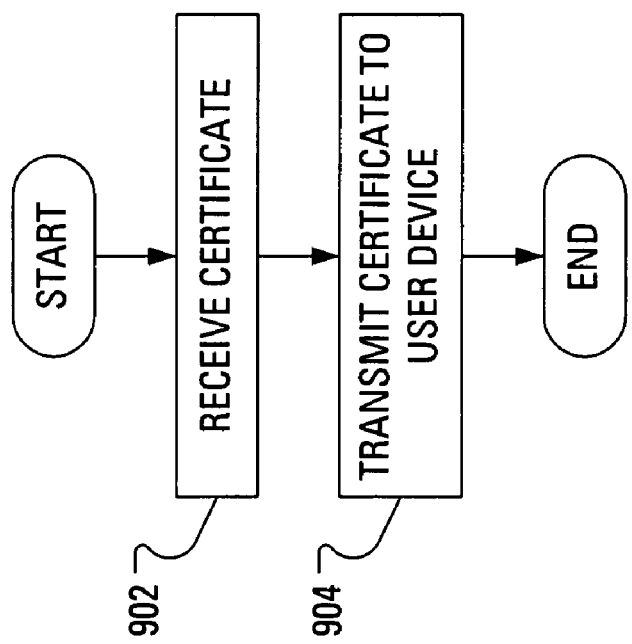
FIG. 9 illustrates example steps in a method of handling, at the mail server of FIG. 1, receipt of an identity certificate from the certificate server of FIG. 1.

Example steps in a method of handling, at the wireless mail server 118, receipt of an identity certificate from the certificate server 116 are illustrated in FIG. 9. Upon receiving (step 902) identity certificate from the certificate server 116, the wireless mail server 118 transmits (step 904) the identity certificate to the user device 100. Such transmission (step 904) of the identity certificate to the user device 100 may be accomplished over a configuration channel between the wireless mail server 118 and the user device 100.

The user device 100, upon receiving the identity certificate, may store the identity certificate in association with the key pair 124, the public key portion of which was included in the formulation (step 408, FIG. 4) of the certification request. As noted in conjunction with the description of FIG. 6, above, the CA 130 signs (step 606) the identity certificate.

In an alternative embodiment, the CA 130 generates (not shown) a signature to accompany the certificate issuance notification e-mail message transmitted in step 610. After formulating the certificate issuance notification e-mail message, the CA 130 may generate a hash of the certificate issuance notification e-mail message and encrypt the hash of the certificate issuance notification e-mail message using the private key of the CA 130. The encrypted hash of the certificate issuance notification e-mail message may then be transmitted along with the certificate issuance notification e-mail message as the signature.

Figure 10:
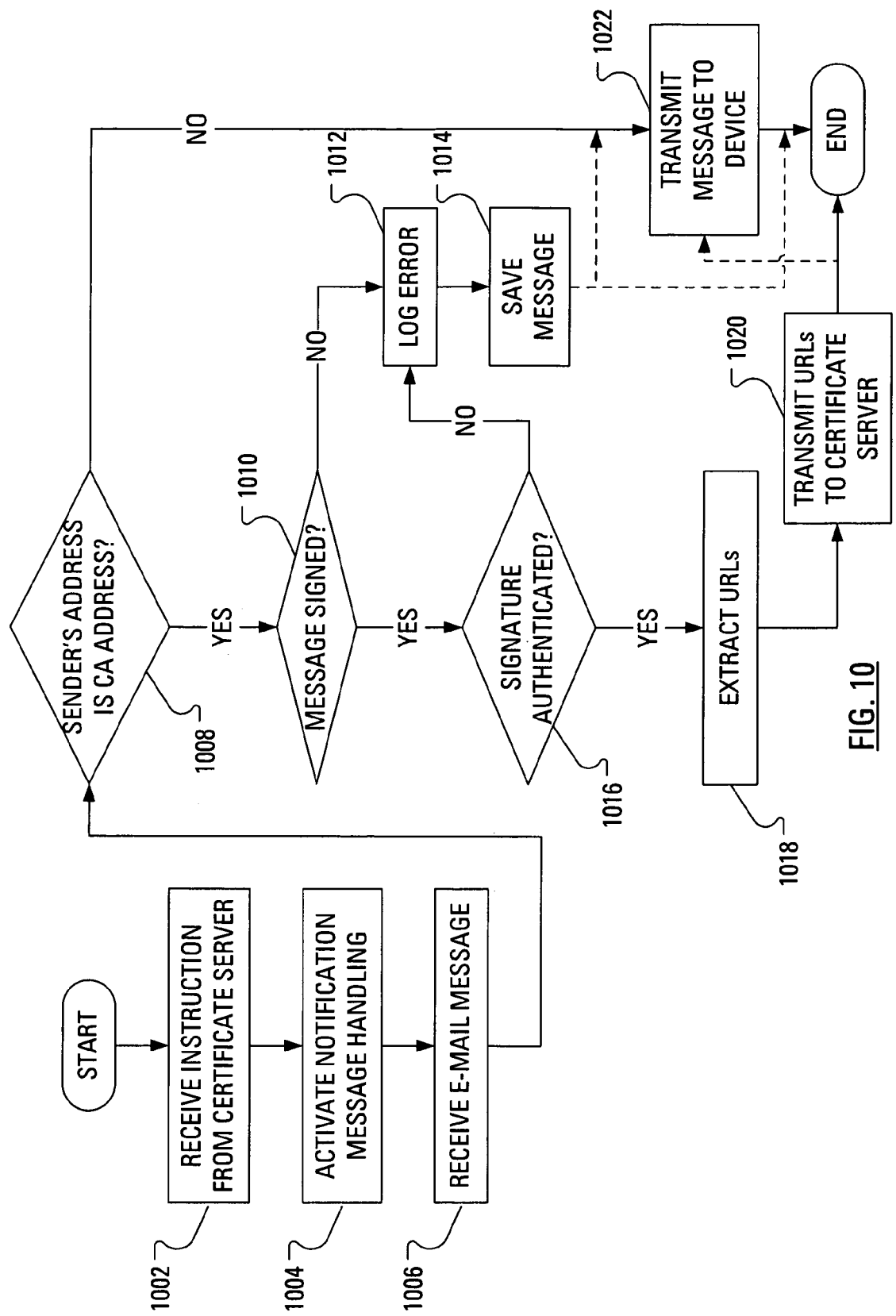
FIG. 10 illustrates example steps in a method of handling, at the mail server of FIG. 1, a signed certificate issuance notification e-mail message from the certificate authority of FIG. 1.

Example steps in a method of handling, at the wireless mail server 118, the signed certificate issuance notification e-mail message from the CA 130 are illustrated in FIG. 10.

Upon receiving (step 1002) an instruction from the certificate server 116, wireless mail server 118 may depart from routine message handling and activate (step 1004) certificate issuance notification message handling, wherein the wireless mail server 118 receives (step 1006) an incoming e-mail message and inspects the incoming e-mail message to determine (step 1008) whether the sender address of the incoming e-mail message matches the previously recorded address for the CA 130. Such determining may be accomplished by inspecting the header of the certificate issuance notification e-mail message.

Responsive to determining (step 1008) that the sender address of the incoming e-mail message does not match the previously recorded address for the CA 130, the wireless mail server 118 may simply forward (step 1022) the e-mail message to the user device 100.

Responsive to determining (step 1008) that the sender address of the incoming e-mail message does match the previously recorded address for the CA 130, the wireless mail server 118 may determine (step 1010) whether the certificate issuance notification e-mail message is accompanied by a signature.

Upon determining (step 710) that the certificate issuance notification e-mail message is not accompanied by a signature, the wireless mail server 118 may log (step 1012) the event as an error and save (step 1014) the certificate issuance notification e-mail message for further investigation. The wireless mail server 118 may forward (step 1022) the e-mail message to the user device 100, or not, depending on configuration of the wireless mail server 118.

Upon determining (step 710) that the certificate issuance notification e-mail message is accompanied by a signature, the wireless mail server 118 may determine (step 1016) whether the signature is authentic, i.e., whether the signature appropriately corresponds to the signature that is expected for the CA 130. Such determining may involve use of the certificate issuance notification e-mail message and the public key of the CA 130.

Upon determining (step 1016) the signature is not authentic, the wireless mail server 118 may log (step 1012) the event as an error and save (step 1014) the e-mail message for further investigation. The wireless mail server 118 may forward (step 1022) the e-mail message to the user device 100, or not, depending on configuration of the wireless mail server 118.

Upon determining (step 1016) that the signature is authentic, the wireless mail server 118 may extract (step 1018) one or more URLs from the e-mail message and transmit (step 1020) the URLs extracted from the e-mail message to the certificate server 116. The wireless mail server 118 may also transmit an indication of the e-mail address of the intended recipient of the certificate issuance notification e-mail message, determined from the header of the certificate issuance notification e-mail message, to the certificate server 116.

The certificate server 116 may handle the URLs received from the wireless mail server 118 as illustrated in FIG. 8, however, the certificate server 116 may take a simplified approach.

Figure 11:
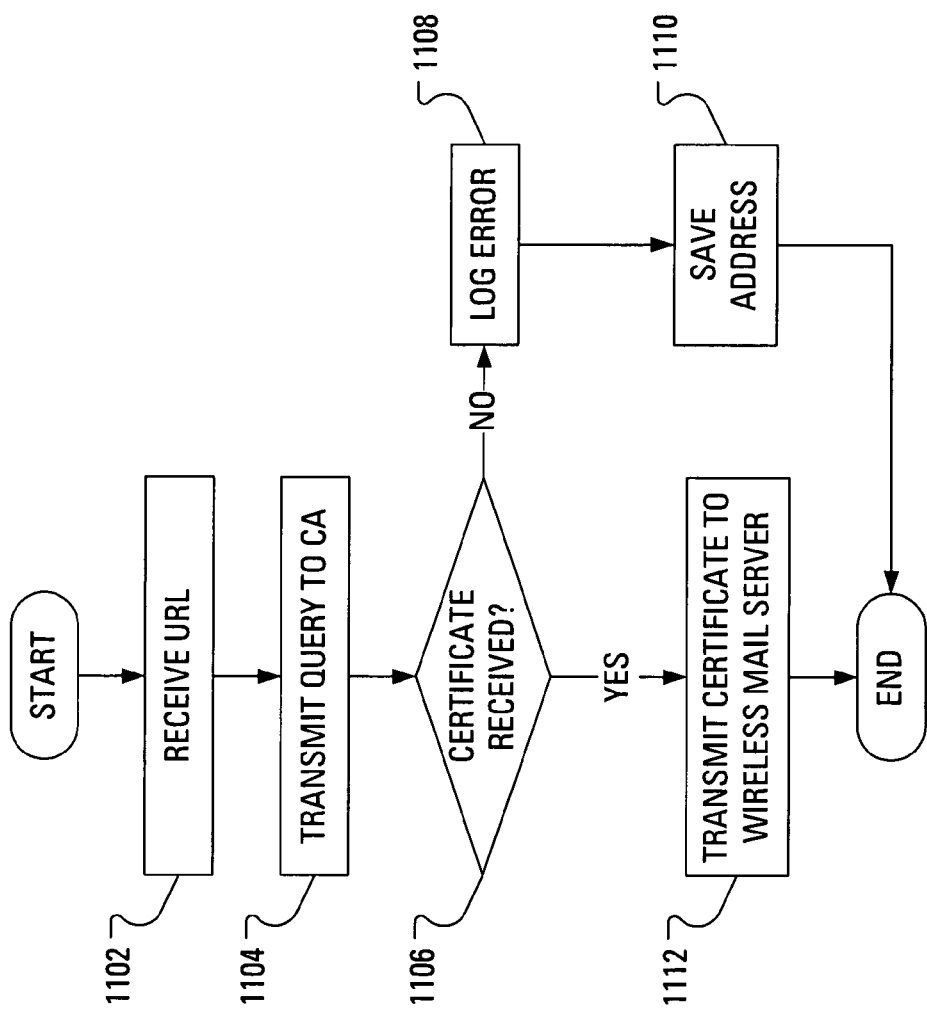
FIG. 11 illustrates example steps in a simplified method of handling, at the certificate server of FIG. 1, a single URL from the mail server of FIG. 1.

Example steps in a simplified method of handling, at the certificate server 116, a single URL from the wireless mail server 118 are illustrated in FIG. 11. Upon receiving (step 1102) the URL from the wireless mail server 118, the certificate server 116 may use the URL to transmit (step 1104) a query to the CA 130.

Upon determining (step 1106) that no identity certificate has been received responsive to the query transmitted (in step 1104) to the CA 130, the certificate server 116 may log (step 1108) the event as an error and save (step 1110) the e-mail address and the URL for further investigation.

Upon determining (step 1106) that an identity certificate has been received responsive to the query transmitted (in step 1104) to the CA 130, the certificate server 116 may transmit (step 1112) the received identity certificate to the wireless mail server 118, where receipt of the identity certificate may be handled as illustrated in FIG. 9.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method, for being performed by a mail server having a receiver, a processor and a transmitter, of validating a certificate issuance notification message, said method comprising:
   receiving, at said receiver, a message;
   determining, at said processor, that said message comprises a certificate issuance notification message;
   extracting a plurality of uniform resource locators from said certificate issuance notification message;
   determining that a quantity of said plurality of said extracted uniform resource locators is less than a maximum expected count of uniform resource locators, thereby verifying, at said processor, that said certificate issuance notification message conforms to expected norms specific to certificate issuance notification messages; and
   responsive to said verifying, transmitting, at said transmitter, a selected uniform resource locator, from among said plurality of uniform resource locators extracted from said certificate issuance notification message, to a network entity configured for processing certificate issuance.

2. The method of claim 1 wherein said determining that said message comprises a certificate issuance notification message comprises determining that a sender of said message is a certificate authority.

3. The method of claim 1 wherein said verifying that said certificate issuance notification message conforms to expected norms specific to certificate issuance notification messages comprises determining that a size of said message is less than a predetermined maximum message size.

4. The method of claim 1 further comprising:
   receiving an instruction from said network entity; and
   responsive to said instruction, activating certificate issuance notification message handling.

5. A mail server comprising:
   a receiver adapted to receive a message;
   a processor adapted to:
      determine that said message comprises a certificate issuance notification message;
      extract a plurality of uniform resource locators from said certificate issuance notification message;
      determine that a quantity of said plurality of said extracted uniform resource locators is less than a maximum expected count of uniform resource locators, to thereby verify that said certificate issuance notification message conforms to expected norms specific to certificate issuance notification messages; and
   a transmitter adapted to transmit a selected uniform resource locator, from among said plurality of uniform resource locators, to a network entity configured for processing certificate issuance.

6. A non-transitory computer-readable medium containing computer-executable instructions that, when performed by a processor in a mail server, cause said processor to:
   receive a message;
   determine that said message comprises a certificate issuance notification message;
   extract a plurality of uniform resource locators from said certificate issuance notification message;
   determine that a quantity of said plurality of said extracted uniform resource locators is less than a maximum expected count of uniform resource locators, to thereby verify that said certificate issuance notification message conforms to expected norms specific to certificate issuance notification messages;
   transmit a selected uniform resource locator, from among said plurality of uniform resource locators, to a network entity configured for processing certificate issuance.

7. A method, for being performed by a mail server having a receiver, a processor and a transmitter, of validating a certificate issuance notification message, said method comprising:
   receiving, at said receiver, a message;
   determining, at said processor, that said message comprises a certificate issuance notification message;
   determining, at said processor, that said message is associated with a signature;
   authenticating, at said processor, said signature;
   responsive to said authenticating, extracting, at said processor, a uniform resource locator from said certificate issuance notification message;
   confirming that a prefix of said uniform resource locator matches a prefix associated with one of a set of certificate authorities from which identity certificates are retrieved; and
   transmitting, at said transmitter, said uniform resource locator to a network entity configured for processing certificate issuance.

8. The method of claim 7 wherein said determining that said message comprises a certificate issuance notification message comprises determining that a sender of said message is a certificate authority.

9. A mail server comprising:
   a receiver adapted to receive a message;
   a processor adapted to:
      determine that said message comprises a certificate issuance notification message;
      determine that said message is associated with a signature;
      authenticate said signature; and
      extract a uniform resource locator from said certificate issuance notification message;
      confirm that a prefix of said uniform resource locator matches a prefix associated with one of a set of certificate authorities from which identity certificates are retrieved; and
   a transmitter adapted to transmit said uniform resource locator to a network entity configured for processing certificate issuance.

10. A non-transitory computer-readable medium containing computer-executable instructions that, when performed by a processor in a mail server, cause said processor to:
   receive a message;
   determine that said message comprises a certificate issuance notification message;
   determine that said message is associated with a signature;
   authenticate said signature;
   extract a uniform resource locator from said certificate issuance notification message;
   confirm that a prefix of said uniform resource locator matches a prefix associated with one of a set of certificate authorities from which identity certificates are retrieved; and
   transmit said uniform resource locator to a network entity configured for processing certificate issuance.

* * * * *